Figure 1:
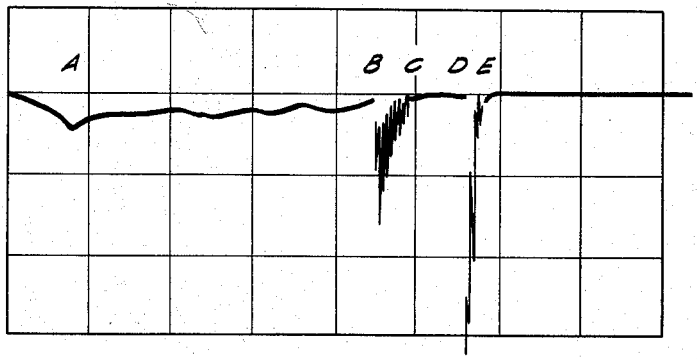

March 2, 1965

M. L. STITCH 3,172,056

SYSTEM FOR PRODUCING HIGHLY REPETITIVE
OPTICAL MASER OPERATION

Filed Aug. 18, 1961

INVENTOR.
MALCOLM L. STITCH,
BY John M. Koch
ATTORNEY.

3,172,056
SYSTEM FOR PRODUCING HIGHLY REPETITIVE OPTICAL MASER OPERATION
Malcolm L. Stitch, Los Angeles, Calif., assignor to Hughes Aircraft Company, Culver City, Calif., a corporation of Delaware
Filed Aug. 18, 1961, Ser. No. 132,393
5 Claims. (Cl. 331—94.5)

This invention relates to the operation and control of a maser, or laser oscillator, and particularly to the control of light energy emitted from an optical maser, or laser.

For some applications of optical masers, such as for pulsed coherent light detecting and ranging, it is highly desirable to be able to produce periodic, controllable, low jitter pulses so that gating methods can be used to discriminate against back-scatter clutter and to increase signal-to-noise ratio by increasing sample count. The attainment of this type of pulse output also simplifies the problem of obtaining direct digital readout of range information.

A problem has been encountered when three-level optical masers are used in pulsed coherent light detecting and ranging systems. The excessive amount of energy required to achieve optical maser action has necessitated the use of a prolonged cooling period following the application of the excitation or pumping pulse to the maser material and before the subsequent application of another such excitation or pumping pulse. If such a prolonged cooling period is not employed, the flash tube has a short service life because it is damaged by the generation of an excessive amount of heat.

An additional problem encountered when applying a three-level optical maser to a pulsed ranging system is the sizeable amount of jitter observed between the application of excitation or pumping pulses to the maser material and the consequent onset of stimulated emission output therefrom. When employing a ruby as the optical maser material, a randomness of as much as 100 microseconds is not unusual. If sufficient care is not taken to maintain the temperature of the ruby reasonably constant, and to prevent excessive deterioration of the flash tube, the jitter or slippage of the pulses emitted by the ruby become much worse. Furthermore, the maser may completely fail to emit light pulses. Most frequently the emission takes the form of a train of randomly spaced and powered pulselets. Thus, in the past it has been difficult to sufficiently control the excitation or pumping pulse to obtain even repeatable performance, let alone output with little or no jitter.

Accordingly, it is an important object of this invention to provide a system for producing highly repetitive optical maser operation to produce pulses of emitted light in a periodic, predictable and controllable manner without the use of shutters.

Additional objects will become apparent from the following description which is given primarily for purposes of illustration and not limitation.

Stated in general terms, the objects of this invention are attained by providing a system and apparatus for operating an optical maser which includes: a generally cylindrical cavity having a reflective surface which preferably is generally elliptical, parabolic, hyperbolic, or of other generally concave curvature, and preferably has two focal axes and a longitudinal axis; an elongate maser material element positioned with its longitudinal axis in parallel relationship with the longitudinal axis of the cavity and preferably in the vicinity of one of the two focal axes thereof; a first source of exciting or pumping energy positioned in parallel relationship with the longitudinal axis of the cavity and preferably in the vicinity of the other focal axis thereof, for exciting or pumping the maser material from a relaxed or ground state to a stimulated emission or "cocked" state; and preferably a second source of exciting or "triggering" energy positioned in parallel relationship with the longitudinal axis of the cavity and in the vicinity of the said other focal axis thereof, for exciting or "triggering" the maser material to a state of stimulated emission from a state below the threshold or emission level of oscillation of the maser material, and then repetitively triggering further stimulated emission pulses before sufficient relaxation has occurred from a previous pulse.

The invention is based upon a system involving a method of obtaining a short pulse of coherent light. The optical maser, such as a three-level maser, as represented by the ruby optical maser, has a characteristic relaxation time between the excited or pumped state and the ground or relaxed state of the order of several milliseconds, depending upon the prevailing ruby crystal temperature. This emission time is greatly reduced when the population inversion is sufficient to give rise to stimulated emission, that is, optical maser action. For three-level devices, such as the ruby maser, a very sizeable portion of the pumping energy is required to transport just half of the ground state population to the excited state, and so bring the optical maser to the point of oscillation. The additional amount of pumping energy required to produce stimulated emission from the resulting, thus excited maser material, is relatively small.

The gist of the method of this invention is to use the indication of excited optical maser output as a preparation or "cocking" state for the maser material, and a short time thereafter, which is short compared to the relaxation time for the particular maser material, by the application of a much less energetic sharp pulse, stimulate or "trigger" a short, sharp emission pulse from the maser material. Since the optical maser crystal is slightly below the threshold level of oscillation after it has been placed in the excited, preparation or "cocked" state, the subsequent "triggering" relatively low energy, sharp excitation pulse, upon being applied to the crystal, is sufficient to bring about an immediate sharp emission pulse therefrom.

One specific method of accomplishing the objectives of this invention involves the employment of a system in which two power supplies are used to operate the exciting or pumping lamps. One power supply provides a long, high energy pulse to accomplish the preparation state, or to "cock," so to speak, the maser material to an excited energy state below the threshold level of maser emission, and the second power supply provides a short, sharp, low energy pulse, which is switched on shortly after attainment of the cocked state to provide a "hair-trigger" operation resulting in the production of a high intensity, short, sharp pulse under controlled conditions.

An example of this operation is as follows. A ruby rod of maser material, which is prepared from a single crystal of ruby by methods known in the art, including doping aluminum oxide with chromium oxide, was encircled by a small spiral flash tube which, in turn, was placed within a second larger spiral flash tube so that the ruby rod and flash tubes were coaxially positioned with respect to each other. A pulse of light having a rectangular shape was caused to be emitted from the larger outer flash tube. This pulse had just sufficient time duration for the ruby rod to commence emitting in optical maser action. At that point, the pulse was switched off, and the optical maser action ceased. Approximately 100 microseconds later a very short, relatively low energy pulse was applied to the inner, smaller flash tube. The ruby rod of maser material was observed to emit one or two microseconds later. The emitted optical maser pulse thus produced was found to be much more vigorous than a pulse normally emitted by the use of a single pumping flash tube, such as in the preparation or cocking state described hereinabove.

FIG. 1 shows a photographic trace obtained by the use of this method of operation. The scale is 100 microseconds per division. At region A on the trace the preparation phase of optical excitation was commenced. Point B indicates the onset of stimulated emission during the preparation or cocking phase. At point C the preparation phase was switched off and the relaxation phase began. D indicates the point at which the hair-trigger excitation phase was applied. The vigorous stimulated emission pulse at E followed the preparation phase and occurred in the hair-trigger step.

Figure 2:
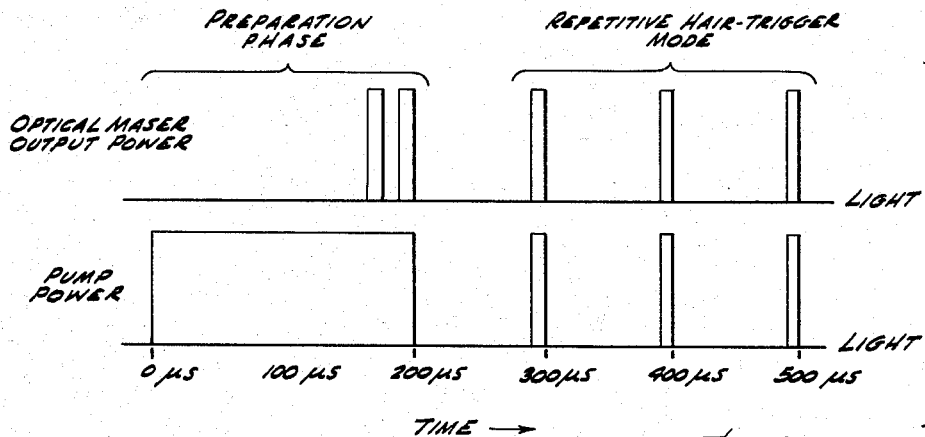

Among the various uses to which the invention can be applied is that of ranging by the use of a pulsed coherent light detecting and ranging optical system. The improvement in ranging performance by the use of this invention against clutter is twofold. First, the long train of pulselets normally observed by the use of one energy lamp, where the front edge of the pulselets is reflected from the target while the rear portion is back-scattered by successively closer in portions of atmospheric dust and moisture, is replaced by a single sharp pulse. Second, this pulse is repeated in a period that is greater than the ranging time, and thus one can apply the statistics of repeated data for calculating the improvement of signal-to-noise ratio. For example, the pulse repetition rate illustrated in FIG. 2 is suitable for ranging up to about nine miles. Slower repetition rates give longer ranges. In this method the excitation flash lamp is turned off after the ruby rod of maser material is excited to the preparation or cocked state. After the excitation or pumping lamp is turned off, short bursts of excitation pulses are produced with a periodicity which is short, compared to the relaxation time of the ruby rod, and a periodic optical maser output or pulse is produced in predictable fashion.

In FIG. 2 the output power is shown to be the same in the repetitive hair-trigger mode, having a repetition rate of $10^4$ pulses per second, as in the preparation phase. The much higher relative efficiency of this mode makes it possible not only to increase the duty cycle, but to increase the peak output as well. It will be observed that the jitter between optical maser output and pump input is greatly reduced.

Figure 3:
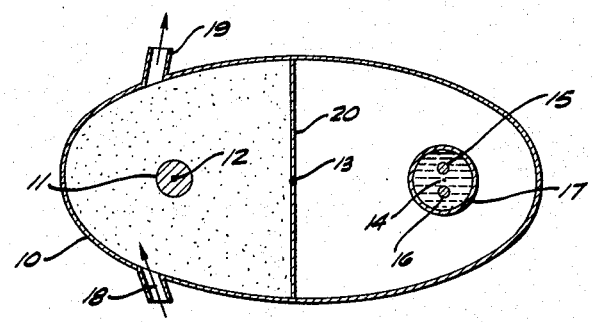

FIG. 3 illustrates a specific embodiment of an optical maser of the invention. The figure is a schematic, cross-sectional view of an elliptical cylindrical cavity 10 and the components housed thereby. Cavity 10 is polished and serves as a reflector of light energy. A ruby rod 11 of maser material is positioned with its longitudinal axis coaxial with the focal axis 12 of one of the two foci of cavity 10 and in parallel relationship with the longitudinal central axis 13 of the cavity.

Similarly positioned at the other focal axis 14 of the other one of the two foci of cavity 10, are two elongated flash tubes 15 and 16, respectively. Flash tube 15 is the preparation phase, or cocking flash tube, and flash tube 16 is the repetitive triggering flash tube. Flash tube 15 is connected to a high energy transmission line pulser (not shown) of the type used conventionally for exciting optical masers to the stimulated emission stage. Flash tube 16 is connected to a high voltage, adjustable pulse-repetition-rate pulser (not shown) of the ring modulation type, for example. The energy capacity of this pulser is determined by the number of repetitions desired.

A cylindrical fused silica tube 17 is positioned around flash tubes 15 and 16 with its axis coaxial with focal axis 14 of cavity 10. Tube 17 is mounted in cavity 10 so that liquid coolant can be circulated therethrough around flash tubes 15 and 16 to increase their service life.

Similarly, ruby rod 11 is cooled by passing refrigerated gaseous nitrogen, for example, around it via inlet 18 and outlet 19 formed in the sidewalls of cavity 10, as indicated in FIG. 3. A transparent partition 20 is mounted longitudinally in cavity 10 to provide thermal insulation from the flash tubes for ruby rod 11.

In operation, flash tube 15 is energized by the high energy transmission line pulser to excite ruby rod 11 to a point somewhat below the threshold level of excitation to thus prepare or cock the ruby rod. This point is established for a given ruby rod by prior testing, or by the use of suitable sensing means. A phototube, for example, can be used to detect stimulated emission. When the maser material in ruby rod 11 is sufficiently excited, i.e., prepared or cocked, flash tube 15 is de-energized, and, after a time less than the relaxation time for the ruby rod, flash tube 16 is energized sufficiently to excite ruby rod 11 above the threshold for emission. Thus ruby rod 11 is triggered by flash tube 16 to emit a short pulse of high intensity light energy of decreased noise-like characteristics. The triggering of ruby rod 11 in this manner is repeated as described above. Ruby rod 11 is automatically put into an excited state by each hair-trigger excitation pulse and returns to a near threshold state after each hair-trigger mode emission. Thus ruby rod 11 need be re-excited by the high energy preparation state only if the apparatus is turned off for a period equal to the relaxation time (for ruby this is approximately 3 milliseconds).

Obviously many other modifications and variations of the present invention are possible in the light of the above teachings. It is therefore to be understood that within the scope of the appended claims the invention can be practised otherwise than as specifically described.

What is claimed is:

1. An optical maser comprising a generally cylindrical cavity having a reflecting surface, a longitudinal axis and only two focal axes therein, an elongate maser material element with its longitudinal axis positioned in parallel relationship with the longitudinal axis of the cavity and in the vicinity of a focal axis thereof, a first source of exciting energy positioned in parallel relationship with the longitudinal axis of the cavity and in the vicinity of the other focal axis thereof for exciting the maser material from a relaxed state to slightly below the threshold of a stimulated emission state by emitting a relatively long, high energy pulse, and a second source of exciting energy positioned in parallel relationship with the longitudinal axis of the cavity and in the vicinity of said other focal axis thereof for exciting the maser material to above the threshold level of oscillation from a level slightly below the threshold level of excitation by emitting a relatively short, low energy pulse, said first and second sources of exciting energy being capable of being sequentially energized to produce their respective exciting pulses within the relaxation time of the maser material.

2. An optical maser comprising a generally elliptical cylindrical cavity having a longitudinal central axis and two focal axes, an elongate maser material element with its longitudinal axis positioned in parallel relationship with the longitudinal axis of the cavity and in the vicinity of one focal axis thereof, a first source of exciting energy positioned in parallel relationship with the longitudinal axis of the cavity and in the vicinity of the other focal axis thereof for exciting the maser material from a relaxed state to slightly below the threshold of a stimulated emission state by emitting a relatively long, high energy pulse, and a second source of exciting energy positioned in parallel relationship with the longitudinal axis of the cavity and in the vicinity of the other focal axis thereof for exciting the maser material to above the threshold level of oscillation from a level slightly below the threshold level of excitation, said first and second sources of exciting energy being capable of being sequentially energized to produce their respective exciting pulses within the relaxation time of the maser material.

3. An optical maser according to claim 2, wherein the maser material is a ruby rod.

4. An optical maser according to claim 2, wherein the sources of exciting energy are flash tube means.

5. An optical maser according to claim 2, wherein the maser material and the sources of exciting energy are cooled by means for circulating cooled fluids therearound.

References Cited by the Examiner
UNITED STATES PATENTS 2,929,922   3/60   Schawlow et al _____ 88—61

OTHER REFERENCES

Collins et al.: "Coherence, Narrowing, Directionality, and Relaxation Oscillations in the Light Emission From Ruby," in Physical Review Letters, vol. 5, No. 7, October 1, 1960, pages 303–305.

JEWELL H. PEDERSEN, *Primary Examiner.*

FREDERICK M. STRADER, *Examiner.*